(12) United States Patent
Dejaiffe

(10) Patent No.: US 6,913,643 B2
(45) Date of Patent: Jul. 5, 2005

(54) LIGHTWEIGHT FOAMED GLASS AGGREGATE

(75) Inventor: Robert Dejaiffe, Kennewick, WA (US)

(73) Assignee: Integrated Environmental Technologies, LLC, Richland, WA (US)

( * ) Notice: Subject to any disclaimer, the term of this patent is extended or adjusted under 35 U.S.C. 154(b) by 52 days.

(21) Appl. No.: 10/369,784

(22) Filed: Feb. 18, 2003

(65) Prior Publication Data

US 2004/0162210 A1 Aug. 19, 2004

(51) Int. Cl.$^7$ .............................................. C04B 14/24
(52) U.S. Cl. ........................................................ 106/716
(58) Field of Search ........................................ 106/716

(56) References Cited

U.S. PATENT DOCUMENTS

| | | | | |
|---|---|---|---|---|
| 4,347,326 A | * | 8/1982 | Iwami et al. | 501/39 |
| 6,616,752 B1 | * | 9/2003 | Basura et al. | 106/716 |
| 6,642,164 B2 | * | 11/2003 | Akaishi | 501/80 |

FOREIGN PATENT DOCUMENTS

| | | | |
|---|---|---|---|
| BE | 698871 | * | 11/1967 |
| CH | 690680 | * | 12/2000 |
| DE | 54626 | * | 3/1967 |
| DE | 59035 | * | 12/1967 |
| DE | 2409328 | * | 8/1974 |
| DE | 19603014 | * | 7/1997 |
| DE | 19910268 | * | 9/2000 |
| DE | 2000 6615 | * | 9/2000 |
| DE | 10031899 | * | 3/2001 |
| DE | 10159340 | * | 6/2002 |
| EP | 665195 | * | 8/1995 |
| EP | 999193 | * | 5/2000 |
| EP | 1085138 | * | 3/2001 |
| HU | 15032 | * | 6/1978 |
| HU | 40056 | * | 11/1986 |
| HU | 66618 | * | 12/1994 |
| JP | 59088363 | * | 5/1984 |
| JP | 59203755 | * | 11/1984 |
| JP | 60204646 | * | 10/1985 |
| JP | 08081251 | * | 3/1996 |
| JP | 09124378 | * | 5/1997 |
| JP | 11199346 | * | 7/1999 |
| JP | 11278900 | * | 10/1999 |
| JP | 2000026136 | * | 1/2000 |
| JP | 2000247764 | * | 9/2000 |
| JP | 2001106552 | * | 4/2001 |
| JP | 2002070028 | * | 3/2002 |
| SU | 135 7388 | * | 12/1987 |
| WO | WO 9502562 | * | 1/1995 |
| WO | WO 9817452 | * | 4/1998 |
| WO | WO 2001020094 | * | 3/2001 |

OTHER PUBLICATIONS

Practical study on super lightweight cellular concrete—the influence of lightweight aggregates & cellular form on early age shrinkage of concrete, Semento, Konkurito Ronbunshu (2000), 54, 680–86.*

"Heat insulating properties of enclosing structures based on foamed glass granulate", Saakyan, Stroitel 'nye Materialy (1991), 6, 3–4.*

"Lightweight concretes from foamed glass granules" Putlyaev et al., Beton i Zhelezobeton (Moscow, Russ. Fed) 11, 15–16, 1990.*

\* cited by examiner

*Primary Examiner*—Paul Marcantoni
(74) *Attorney, Agent, or Firm*—Douglas E. McKinley, Jr.

(57) ABSTRACT

A lightweight aggregate for use in concrete exhibiting a high weight to strength ratio comprising a mixture of hydrated cement and a low sodium closed-cell foamed glass comprised of between 51 and 65 weight percent silica, between 8 and 14 weight percent alumina, between 2 and 5 weight percent soda, between 18 and 26 weight percent calcia, between 2 and 5 weight percent iron oxide, and up to 8 percent lithium oxide.

7 Claims, No Drawings

LIGHTWEIGHT FOAMED GLASS AGGREGATE

CROSS-REFERENCE TO RELATED APPLICATIONS

Not Applicable

BACKGROUND OF THE INVENTION

The cost and energy associated with the production and/or mining of raw materials for use in consumer and industrial products, together with the cost, energy, and environmental consequences of disposal the byproducts formed during fabrication of finished products, and the disposal of finished products themselves post-use, creates enormous incentives towards finding secondary uses for unwanted materials. Enormous investments in recycling and waste to energy technologies over the past several decades are testament to the economic advantages inherent in re-using and recycling materials. Competitive pressures, combined with these economic advantages, have resulted in the adaptation of waste minimization technologies, recycling, and re-use programs by virtually all major manufacturing industries. However, despite the economic advantages created by these strategies, massive volumes of the byproducts of industrial production and finished products post-use are still typically in a condition unsuitable for re-use and recycling, and huge volumes of these materials are disposed of in landfills and hazardous waste disposal sites on a daily basis.

Some of the more vexing difficulties that prevents more widespread adaptation of re-use and recycling strategies are related to the inherent hazardous nature of many of these materials, the cost and expense of processing heterogeneous streams of these waste materials, and finding applications for re-use that would consume significant volumes of these materials. One application for re-use that has long been recognized as having the potential for high volume usage is as a construction material. For example, concrete is exceeded only by water in the commercial tonnage used annually in the United States. Thus, any product or bi-product that could conceivably be utilized as an aggregate in a concrete mixture would have an enormous "sink" through which the materials could be re-used and thereby incorporated into valuable products. These advantages have led to the incorporation of fly ash generated in commercial boilers and blast furnace slag into concrete for construction. Some of the advantages of using fly ash in concrete were set forth in the Naval Facilities Engineering Service Center (NFESC) Technical Report TR-2195-SHR "Alkali-Silica Reaction Mitigation State-Of-The-Art" by L. J. Malvar, published in October 2001, the entire contents of which are incorporated herein by this reference. As described in the NFESC report, the use of Class F (low calcium) fly ash as a replacement for Portland cement in amounts around 25% has been shown to mitigate the effects of the Alkali-Silica Reaction (ASR) in concrete. Briefly, the ASR takes place when silica is surrounded by high pH cement paste, typically as a result of the high calcium and other alkaline content of the cement. The silica in this environment tends to react with the calcium to form a gel of calcium silicate which tends to swell over a period of time, typically ranging from as little as a few months to a few years. This swelling causes stress in the concrete, thereby weakening it. As further pointed out in the NFESC report, the 25% Class F fly ash replacement also resulted in less expansion than 35% Class C fly ash, which the authors note had previously been shown to either not reduce, or to aggravate the ASR problem. This is because the Class C fly ash exhibits a larger percentage of calcium. Thus, among the drawbacks associated with the widespread re-use of fly ash as an additive to concrete are differences associated with the differing types of fly ash, and their effect on the ASR in the final product.

Problems associated with the use of waste materials in concrete and ASR have also received notable attention with respect to glass materials. In U.S. Pat. No. 6,500,254, entitled "Cements including lithium glass compositions" issued Dec. 30, 2002 to Baxter et al., the entire contents of which are hereby incorporated herein by this reference, the inventors describe the use of lithium glass as an additive to concrete, and the minimization of ASR thereby. As described by the '254 patent, the lithium glass includes a glass forming oxide; lithium oxide; and optionally a glass network modifying oxide. The inventors further point out that the lithium glass can be essentially free of sodium or potassium ions. While the '254 patent does provide a means by which glass can be manufactured to be a useful additive to concrete, the use of the technology still has many practical drawbacks. For example, among the problems associated with the use of lithium glass as an additive to concrete is the energy intensive process through which glass is manufactured. As described by the inventors of the '254 patent, and as is also common in any commercial glass making operation, to form a glass requires the materials to be heated to a temperature sufficient to melt the glass, thereby allowing its formation. The high energy requirements for this melting operation often will dominate the economic benefits afforded by using glass as an additive. Further, the specific gravity of the resultant glass is similar to that of normal gravel aggregate. Thus, the resulting concrete produces similar or worse weight to strength ratios found in more traditional concrete mixtures.

Improved strength to weight ratios are the subject of wide interest in the concrete industry, and the search for suitable materials has attracted significant research and development investments. For example, Columbia-University has reported that "lightweight concrete is of utmost importance to the construction industry. Most of current research focuses on high-performance concrete by which is meant a cost-effective material that satisfies demanding performance requirements, including durability. The advantages of lightweight concrete are its reduced mass and improved thermal and sound insulation properties, while maintaining adequate strength. The reduced weight has numerous advantages, not the least of them being a reduced demand on energy during construction." The concrete materials research group at Columbia University further reports that they have developed a "new kind of lightweight concrete, which combines the advantages of normal-weight aggregate with cellular concrete, that is, good strength and durability properties as well as thermal and sound insulation." As described by the Columbia researchers, the key is "an admixture that introduces air bubbles into the cement matrix using normal mixing procedures and therefore can be combined with both normal and lightweight aggregate." Thus, while the group at Columbia has apparently discovered a method for producing lightweight concrete, they have not addressed the need for the discovery of lightweight aggregates that incorporate byproducts or waste products in an economically advantageous way, or which would incorporate those materials in a manner which would prevent ASR.

Traditional approaches for large sized lightweight aggregate have included the use of materials such as perlite, expanded shale, and other naturally occurring porous rocks.

Recently, research has examined sintered materials for use as a lightweight aggregate. Typically under either of these approaches, the material has an open structure, allowing it to absorb water. This can complicate the concrete forming process as the aggregate will often compete with the cement for available water. Thus, the aggregate is either soaked in water prior mixing, which can lead to excess water and less than optimal curing, or the aggregate is mixed with the cement immediately prior to use, thus necessitating the additional cost and inconvenience of mixing at or near a jobsite. Further, few small-sized lightweight aggregates have been developed. The industry still relies mainly on sand for small sized aggregates, which, while providing excellent flowability in the concrete mix prior to curing does not provide a particularly advantageous strength to weight ratio in the final product.

Therefore, there exists a need for methods and materials whereby byproducts or waste products can be incorporated into concrete mixtures in an economically advantageous way, which does not result in an unacceptable ASR. There further exists a need for methods and materials that will produce aggregate for concrete in a lightweight form, thereby allowing the formation of a final concrete product having a favorable strength to weight ratio. Most preferably, there exists a need for methods and materials that allow both the incorporation of industrial byproducts and waste products into concrete mixtures in an economically advantageous way in a lightweight form, thereby allowing the formation of a final concrete product having a favorable strength to weight ratio, and which does not result in an unacceptable ASR in the final concrete product. There also exists a need for lightweight aggregate materials that do not absorb water and which can be provided as having small particle sizes to allow a replacement for sand.

SUMMARY OF THE INVENTION

Accordingly, it is an object of the present invention to provide a method for forming a lightweight aggregate suitable for use as an aggregate in concrete. More particularly, it is an object of the present invention to provide a glass material suitable for use as a lightweight aggregate in concrete. It is a further object of the present invention to provide a glass material that is suitable for use as a lightweight aggregate in concrete which requires minimal processing beyond processing that is currently performed in existing industrial processes. It is a further object of the present invention to provide a glass material that is suitable for use as a lightweight aggregate in concrete which requires minimal processing beyond the processing that is currently performed in existing industrial processes and which incorporates a wide variety of waste materials which are otherwise currently disposed of in industrial landfills and/or hazardous waste disposal facilities. It is a further object of the present invention to provide a glass material suitable for use as a lightweight aggregate in concrete which requires minimal processing beyond the processing that is currently performed in existing industrial processes which incorporates a wide variety of waste materials and which minimizes ASR within the resultant cement product. It is a further object of the present invention to provide a glass material suitable for use as a lightweight aggregate in concrete that does not absorb water and/or which may be fabricated as having a small particle size, thereby allowing its use as a replacement to larger porous rocks and sand.

These and other objects of the present invention are accomplished through the use of glass materials formed in high temperature waste treatment systems using either plasma heating, joule heating, or combinations thereof, wherein said glasses are formulated as having a chemical structure suitable for incorporation in cement or concrete, and wherein the glass formed in the high temperature waste treatment systems are further processed with foaming agents to form close celled structures resistant to water absorption. Preferably, the glasses formed by the present invention comprise between 51 and 65 weight percent silica, between 8 and 14 weight percent alumina, between 2 and 5 weight percent sodium oxide, between 18 and 26 weight percent calcia, between 2 and 5 weight percent iron oxide, and up to 8 percent lithium oxide. A variety of factors inherent in this composition provide a stable glass that will not degrade in a concrete mixture, and which will not promote ASR. Since the maintenance of a low pH at the surface of the aggregate will tend to assist the prevention of ASR in the final concrete product, it is preferred that the lightweight aggregate comprise less than 5 weight percent sodium. As used herein, the term "low sodium" thus denotes a glass composition having a sodium oxide content of 5% or less. Similarly, the inclusion of alumina will tend to protect the glass product from degrading.

Several advantages flow from the use of existing high temperature waste processing systems to formulate the light weight glass materials of the present invention. In the first instance, these waste treatment systems are already in use for processing a variety of waste materials. Thus, the energy necessary to melt the glass in its initial formation is already being expended. Also, skilled operators of these systems have the flexibility to adjust the inputs to these systems to produce the desired chemical properties in the resultant glass output. Further, the preferred chemical structure as described herein, allows these systems to incorporate a variety of otherwise difficult, and expensive to dispose of, waste streams at minimal additional cost. For example, glasses containing lithium oxides can be formed using post-consumer lithium batteries and/or lithium bearing spodumene mine tailings as a feed stream. Currently, these batteries are disposed of as waste products, and, due to their reactive nature, present an environmental hazard for the operators of solid waste disposal sites. Incorporating these waste batteries into a useful product, according to the present invention, turns this negative feature into a positive feature. Other materials currently disposed of in industrial landfills and at hazardous waste disposal sites which can be successfully incorporated into suitable glasses for use as an aggregate include fly ash (both Class F and Class C); waste consumer glass used as containers and the like, including colored glasses, used foundry sand, and bottom ash from industrial furnaces.

A further advantage of the present invention is the ability to use intermediate forms of the glasses in a beneficial manner. For example, once the glasses of the present invention are formed in a high temperature waste treatment system, they can be utilized as a high quality abrasive material similar in performance to those described in U.S. Pat. No. 5,462,570 issued Oct. 31, 1995 to Balcar, et al. and entitled "Process for producing an environmentally acceptable abrasive product from hazardous wastes", the entire contents of which are hereby incorporated herein by this reference, prior to forming them into the closed cell structure.

The formation of the glasses into a closed cell structure may be accomplished by heating the glass with foaming agents in a conventional manner, as well as by the methods described in U.S. patent application Ser. No. 09/777,802, filed Feb. 5, 2001, entitled "Crushed Glass Filter Aid and Method of Use" and U.S. patent application Ser. No. 10/011,944, filed Nov. 5, 2001, entitled "Foam Glass and Method of Making" the entire contents of each of which are hereby incorporated herein by this reference. Preferably, the lightweight aggregate of the present invention can be formed in large and small sizes. For both sizes, a typical process begins by ball milling glass of a suitable composition. The glass is then mixed with a foaming agent, as needed. In the case of spray drying, the addition of a foaming agent may be unnecessary as the inherent moisture in the ball milled glass may be sufficient to result in acceptable foaming upon heating.

To form smaller sized lightweight aggregate, which is aggregate having a closed cell structure and approximately the size of sand, the glass is either pelletized, or spray dried, followed by firing in open flame in a manner similar to perlite expansion. Small sized lightweight aggregate provides numerous advantages. The small sized lightweight aggregate tends to distribute itself uniformly in a cementations mixture, thereby avoiding strength problems associated with localized concentrations of aggregate materials in the mixture. Notably, the use of the lightweight aggregates of the present invention are particularly compatible with aerated cement. Further, problems associated with ASR are less of a concern, as any swelling is evenly distributed, avoiding localized stresses that can lead to concrete failure.

Large lightweight aggregates having a closed surface may be formed by foaming the glass in an open ended mold. The size and shape of the light weight aggregates formed in this manner can be easily controlled, by controlling the size and shape of the molds, as well as the amount of starting materials. Close celled lightweight aggregates with open structure at the surface consisting of broken cells can be formed by crushing the large lightweight aggregates. Alternatively, close celled lightweight aggregates with open structure at the surface consisting of broken cells may be formed by spreading the glass and foaming agent on a sheet, heating the mixture, and breaking the resultant foam glass product up into desired aggregate sizes.

Under either approach, additional strength can be achieved by passing the lightweight aggregate through a flash firing process (such as exposure to an open flame) thereby forming a hardened shell. The resultant lightweight aggregate is thereby optimized to obtain the maximum strength to weight ratio.

As noted above, a further advantage of the present invention results from the capacity of the glasses to be used in industrial processes prior to foaming. For example, the glass compositions that are suitable for formation of lightweight aggregates are also suitable for use as a high quality abrasive material. In this manner, the materials find use in a series of industrial processes. First, they are used in the processes and products by which they are originally derived (eg. as the bi-product in the operation of industrial furnaces in the case of bottom ash and fly ash, and as consumer products in the case of colored glass beverage containers and lithium batteries). Then, after forming the materials into a glass, they are crushed and screened, and then used as high quality abrasive materials in industrial and commercial sand blasting operations. Finally, the used abrasive materials are foamed with a suitable blowing agent, where they are again used as a high quality, light weight aggregate in admixture with cement to form a lightweight concrete product. In this manner, a variety of industrial needs are met, while the cost and environmental consequences inherent in the extraction of raw materials is kept to a minimum.

Yet a further advantage of the present invention is derived from the need for additive materials in the operation of commercial high temperature waste treatment systems. In many applications, these high temperature waste treatment systems are utilized to treat waste streams having a high content of carbonaceous materials. For example, combination joule and plasma heated melters (such as the Plasma Enhanced Melter or PEM™ systems manufactured by the assignee of the present invention) have found significant market acceptance processing medical wastes. These medical wastes tend to consist of high percentages of carbonaceous materials. The proper operation of the PEM™ systems thus can often require the introduction of materials necessary to provide a glass bath having the proper chemical characteristics necessary for proper operation of the PEM™ system. The present invention thus affords operators of these systems with the ability to use inputs that would otherwise require expensive and environmentally hazardous disposal, and produce a product that can be used in a series of industrial processes as outlined above.

In a preferred embodiment of the present invention, an admixture, typically called a pozzolan, is further added to the concrete formula to change, spread or reduce the silica reaction to prevent it from becoming a localized source of stress. As noted in the background section, Class F fly ashes have been shown to make good pozzolans, and the use of fly ash as an admixture is increasing in the concrete industry. In the present invention, a blend of fly ashes are used to make the glass aggregate material. This creates an apparent contradiction in that pozzolans (which deter ASR) can be used as the source of the oxides needed to make a glass (with a reputation for ASR problems.) The present invention overcomes this apparent dichotomy as the major difference between "bad" aggregate and "good" pozzolan is particle size (pozzolans are typically fine powders.) In addition, the present invention differs from ordinary waste glass, because the present invention contains alumina which reduces the silica content and increases chemical durability; the present invention contains less soda, reducing leachability; the present invention contains more calcia, promoting formation of cementitious products; and the present invention preferably contains iron, which is beneficial to the concrete.

CLOSURE

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A concrete material comprising a mixture of hydrated cement and a low sodium closed-cell foamed glass wherein the sodium oxide content of said glass is 5 weight percent or less.

2. The concrete material of claim 1 wherein said mixture additionally contains at least one pozzolan.

3. The concrete material of claim 1 wherein said hydrated cement is aerated.

4. The concrete material of claim 1 wherein said closed-cell foamed glass contains lithium oxide.

5. The concrete material of claim 1 wherein said closed-cell foamed glass has a hardened shell formed by a flash firing process.

6. The concrete material of claim 1 wherein said closed-cell foamed glass contains lithium oxide in an amount between about 0.1 to 8 weight percent.

7. A concrete material comprising a mixture of hydrated cement and a low sodium closed-cell foamed glass comprised of between 51 and 65 weight percent silica, between 8 and 14 weight percent alumina, between 2 and 5 weight percent sodium oxide, between 18 and 26 weight percent calcia, between 2 and 5 weight percent iron oxide, and up to 8 percent lithium oxide.

* * * * *